No. 686,103. Patented Nov. 5, 1901.
C. A. MEAD.
SIPHON SKIMMER.
(Application filed May 18, 1901.)
(No Model.)
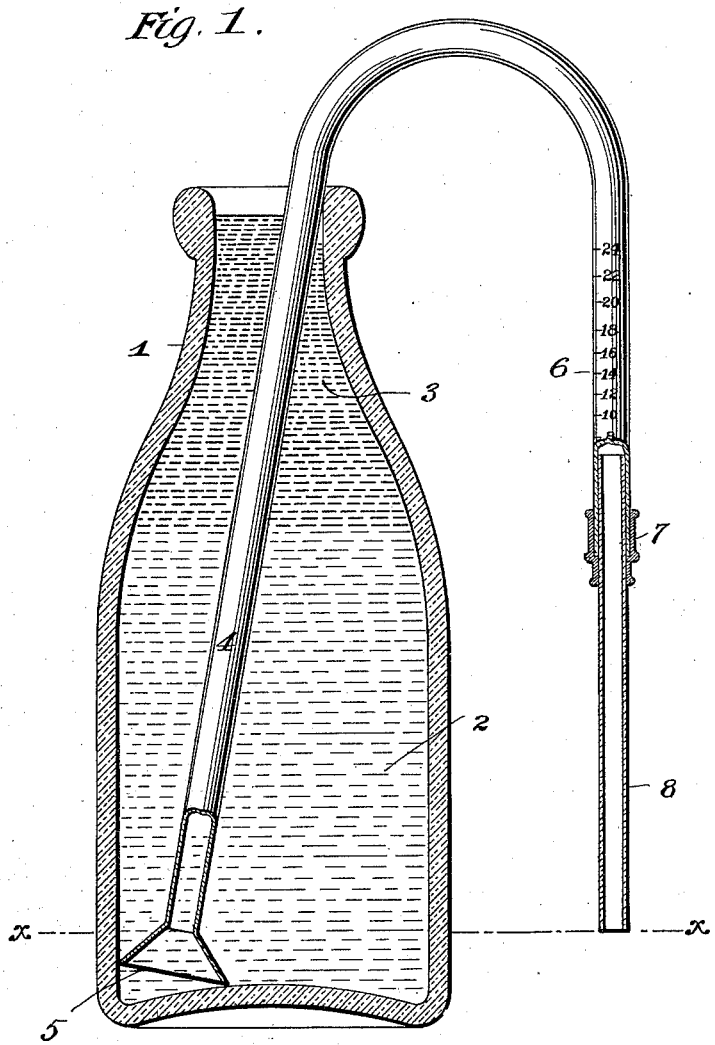
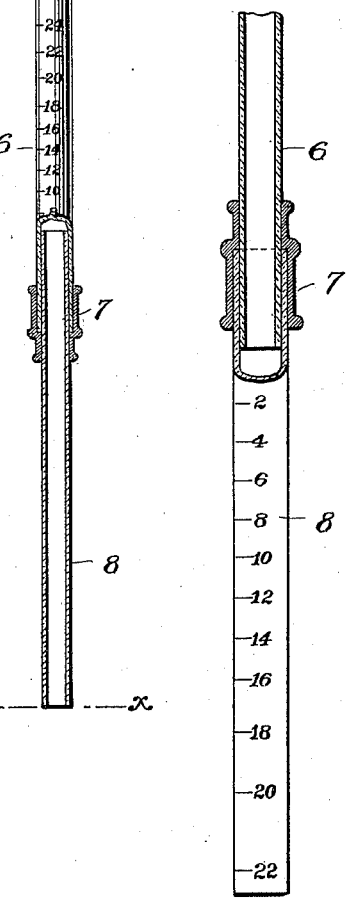
WITNESSES:
Frank A. Ob...
O. P. Metcalf
INVENTOR
Charles A. Mead
BY
Emmons R. Newell
ATTORNEY
THE NORRIS PETERS CO., PHOTO-LITHO., WASHINGTON, D. C.

UNITED STATES PATENT OFFICE.

CHARLES A. MEAD, OF NEWARK, NEW JERSEY.

SIPHON-SKIMMER.

SPECIFICATION forming part of Letters Patent No. 686,103, dated November 5, 1901.

Application filed May 18, 1901. Serial No. 60,841. (No model.)

*To all whom it may concern:*

Be it known that I, CHARLES A. MEAD, a citizen of the United States, residing at Newark, New Jersey, have invented certain new and useful Improvements in Siphon-Skimmers, of which the following is a clear, full, and exact description.

My invention relates to a device for separating milk from cream; and my object is to produce a device by which milk can be siphoned off from a receptacle containing milk and cream and which will automatically cut off the flow and leave the cream or a portion thereof in said receptacle.

Other advantages of my invention will be apparent from the following description, and my invention will be defined in the claims.

In the drawings, Figure 1 shows a central vertical section of the preferred embodiment of my invention, and Fig. 2 a detail of a modification.

In the drawings, 1 is a milk-receptacle. I prefer to use the well-known quart milk-bottle of the present standard size. This quart-bottle is substantially of the shape shown and is substantially three and seven-eighths ($3\frac{7}{8}$) inches in diameter at the point $x$ $x$. The height is about eight and seven-eighths ($8\frac{7}{8}$) inches.

It is often desirable to draw off the milk after the cream has formed without pouring off the cream, because if the cream is poured off from the top of the milk it will not all escape without some of the milk. Furthermore, if the milk is drawn off by means of a siphon which does not reach the bottom of the bottle a certain portion of milk and sediment will remain in the bottle which will make the cream impure, and if a siphon is used in which the lower end of the leg outside the bottle is lower than the end of the leg inside the bottle the cream will be drawn off also, or it must be watched and the siphon removed at the proper time, and if the lower end of the outside leg is higher than the level of the layer of cream which remains after the milk has been drawn off, even if the long leg reaches the bottom of the receptacle, an amount of milk will also be left which will dilute the cream. These quart milk-bottles are of a well-known standard size and shape, and my device provides a siphon which can be started by any one and (as it is of a length sufficient to reach the bottom of the bottle) which will draw off milk and sediment and will automatically cut off the flow at the proper time, so as to leave the desired quantity of cream in the bottle. Thus the mistakes and guesswork of careless nurses will be avoided and the proper quantity of cream free from sediment will be obtained.

The standard quart milk-bottle is shown substantially three-quarters size in the drawings.

2 is the milk, and 3 the layer of cream which has risen from the milk. The siphon has a leg 4, which is of a sufficient length to reach the bottom of the bottle and may be provided with a flaring mouth 5 to more readily take up the sediment at the bottom. The other leg 6 of the siphon is shorter than the leg 4, and the difference in level of the lower end of the two legs is preferably substantially the same as the thickness of the layer of cream left at the bottom of the bottle when the milk has been drawn off. In quart-bottles of the standard size this will usually be substantially equal to the height of a six-ounce column of liquid at the bottom of said bottle; but I do not limit myself to this difference.

In some cases it may be desired to leave only the lightest and thickest portion of the cream in the bottle or a mixture of cream and milk, and I have therefore provided means whereby the level of the lower end of the shorter leg above the level of the mouth of the longer leg may be varied as desired, so as to automatically cut off the flow when the fluid in the bottle has been drawn off to the desired quantity. To accomplish this result, I may form one of the legs, preferably the shorter one, of a plurality of telescoping sections, as shown, which are slidable on each other, so as to vary the difference in the level between the two ends of the siphon. I prefer that this difference in level between the two ends of the siphon shall not be more than three and one-half ($3\frac{1}{2}$) inches, and it is preferably less. A substantially air-tight connection, such as an elastic rubber coupling 7, 100 carried on one section and engaging the other, may be provided to make a tight joint and hold the lower section in its adjusted position; but this connection may not be necessary in all cases, as the sections may fit snugly together, as shown.

In order to accurately adjust the height of the lower end of the shorter leg so that any desired quantity of fluid will remain in the bottle, I may provide a scale, graduated to indicate the quantity of fluid which will remain in the standard quart-bottle at different levels. I prefer to mark this scale on one of the tubes, and I have shown two examples of such marking, the scale in each case reading away (that is, up or down) from the point of juncture of the two sections. In the drawings the scale indicates fluid ounces. If the nurse wishes to leave six ounces of cream (the usual amount) in the bottle, she adjusts the sections to the six-ounce mark, (which may be easily done, as the parts are in this embodiment made of glass, and are therefore transparent,) starts the siphon, and can be absolutely sure that it will siphon off milk and sediment and automatically stop when the fluid has been drawn off to the point where six ounces remain in the bottle.

I am aware that many changes may be made in the constructions disclosed without departing from the spirit of my invention, and I therefore do not desire to limit myself to the embodiments described and illustrated.

What I claim is—

1. In combination with a quart milk-bottle of the standard size, of a siphon having a long and a short leg, the long leg being of a length sufficient to reach the bottom of said bottle, with the shorter leg extending downwardly below the top of said bottle and terminating above the level of the lower end of said longer leg, one of said legs being composed of a plurality of telescoping sections whereby the level of the lower end of said shorter leg above the level of the end of the longer leg may be varied, and a scale graduated to indicate the capacity of said bottle below the level of the lower end of said shorter leg.

2. A siphon having a long and a short leg, the long leg being of a length sufficient to reach the bottom of a quart milk-bottle of the standard size, with the shorter leg extending downwardly and terminating at a point below the top of said bottle and not more than three and a half (3½) inches above the level of the lower end of said longer leg.

3. A siphon having a long and a short leg, the long leg being of a length sufficient to reach the bottom of a quart milk-bottle of the standard size, with the shorter leg extending downwardly and terminating at a point below the top of said bottle and not more than three and a half (3½) inches above the level of said longer leg, and means permitting the adjustment of the height of the end of said shorter leg above the level of the lower end of said longer leg.

4. A siphon having a long and a short leg, the long leg being of a length sufficient to reach the bottom of a quart milk-bottle of the standard size, with the shorter leg extending downwardly and terminating at a point below the top of said bottle and not more than three and a half (3½) inches above the level of said longer leg, one of said legs being composed of a plurality of telescoping sections to permit the adjustment of the height of the end of the shorter leg above the level of the lower end of said longer leg.

5. A siphon having a long and a short leg, the long leg being of a length sufficient to reach the bottom of a quart milk-bottle of the standard size, with the shorter leg extending downwardly and terminating at a point below the top of said bottle and not more than three and a half (3½) inches above the level of said longer leg, said shorter leg being composed of a plurality of telescoping sections to permit the adjustment of the height of the end of the shorter leg above the level of the lower end of said longer leg.

6. A siphon having a long and a short leg, the long leg being of a length sufficient to reach the bottom of a quart milk-bottle of the standard size, with the shorter leg extending downwardly and terminating at a point below the top of said bottle and above the level of said longer leg, said shorter leg being composed of a plurality of telescoping sections to permit the adjustment of the height of the end of the shorter leg above the level of the lower end of said longer leg, in combination with a scale graduated to indicate the capacity of a quart milk-bottle of the standard size below the level of the lower end of said shorter leg when said longer leg touches the bottom of said bottle.

7. A siphon having a long and a short leg, the long leg being of a length sufficient to reach the bottom of a quart milk-bottle of the standard size, with the shorter leg extending downwardly and terminating at a point below the top of said bottle and above the level of said longer leg, said shorter leg being composed of a plurality of telescoping sections to permit the adjustment of the height of the end of the shorter leg above the level of the lower end of said longer leg, in combination with a scale reading away from the joint between said sections and graduated to indicate the capacity of a quart milk-bottle of the standard size below the level of the lower end of said shorter leg when said longer leg touches the bottom of said bottle.

Signed at New York, N. Y., this 16th day of May, 1901.

CHARLES A. MEAD.

Witnesses:
EMERSON R. NEWELL,
JOSEPH E. DIAMOND.